(12) United States Patent
Yoakim et al.

(10) Patent No.: US 6,459,854 B1
(45) Date of Patent: Oct. 1, 2002

(54) PROCESS AND MODULE FOR HEATING LIQUID

(75) Inventors: Alfred Yoakim, St-Legier-la Chiesaz (CH); Ruguo Hu, New Milford, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/617,973

(22) Filed: Oct. 19, 2000

(30) Foreign Application Priority Data

Jan. 24, 2000 (EP) ............................................. 00101336

(51) Int. Cl.[7] ................................................ F24H 1/10
(52) U.S. Cl. ........................ 392/479; 392/485; 222/71
(58) Field of Search .............................. 392/465, 471, 392/479, 485; 222/71

(56) References Cited

U.S. PATENT DOCUMENTS

| | | | | |
|---|---|---|---|---|
| 978,808 A | * | 12/1910 | Ayer | 392/462 |
| 3,247,359 A | * | 4/1966 | Feld | 392/480 |
| 3,898,428 A | | 8/1975 | Dye | 219/305 |
| 4,531,046 A | | 7/1985 | Stover | 219/297 |
| 5,434,388 A | * | 7/1995 | Kralik et al. | 219/538 |
| 5,943,472 A | | 8/1999 | Charles et al. | 392/396 |
| 6,118,933 A | * | 9/2000 | Roberson | 392/442 |

FOREIGN PATENT DOCUMENTS

| | | |
|---|---|---|
| DE | 40 38 462 | 6/1992 |
| FR | 1 106 590 | 12/1955 |
| NL | 8 101 610 | 11/1982 |

* cited by examiner

*Primary Examiner*—Henry Bennett
(74) *Attorney, Agent, or Firm*—Winston & Strawn

(57) ABSTRACT

A liquid heating module for use in a hot beverage machine, a beverage forming system that includes the module, and a process for heating liquid for forming beverages. The liquid heating module includes a hollow metal tube, a cylindrical insert which is disposed inside the hollow tube along its entire length and substantially along its axis of symmetry, at least one electrical resistor on a first outer part of the tube for preheating liquid flowing through the tube, and at least one additional electrical resistor on a second outer part of the tube for temperature adjustment of the liquid flowing through the tube.

25 Claims, 2 Drawing Sheets

PROCESS AND MODULE FOR HEATING LIQUID

TECHNICAL FIELD

The present invention concerns a liquid heating module for use in a hot beverage machine. The invention concerns further a system comprising the module and the use of the module or system in a process for the heating of a liquid.

BACKGROUND ART

In the area of coffee machines, it is already known to have a thermoblock heater in the machine, wherein the heater is permanently under power and allows hot water to be obtained at the moment when the consumer decides to operate the machine for preparing a coffee. There are numerous problems with such machines. First, there is a temperature inconsistency, that is, it is not possible to have a temperature of water permanently in a specific range, such as between 85 and 90° C. This has a negative influence on the quality of the obtained coffee. Secondly, the block-heater used is very heavy, which is not convenient when the coffee machine has to be moved. Thirdly, there is an energy inefficiency, because of the loss of energy during the time when the machine is under power but not being used. Thus, improvements in these type machines are desired and necessary

SUMMARY OF INVENTION

The present invention minimizes the previously mentioned problems in that it provides the consumer with a heating system having a very accurate temperature range without having to be continuously under power and in a light, compact construction.

Specifically, the present invention relates to a liquid heating module for use in a hot beverage machine. The module comprises a hollow tube of metallic material, at least one electrical resistor on a first part of the outside of the tube for preheating liquid flowing through the hollow tube, and at least one additional electrical resistor on a second part of the outside of the tube for temperature adjustment of the liquid flowing through the tube.

Another feature of the invention is the ability of the device to control the temperature of the heated water. In this case, the temperature of the liquid at the exit of the tube is measured, so that if the temperature is too high the electrical resistor on the second part of the tube is disconnected from power. Furthermore, if the temperature of the liquid is not high enough, this electrical resistor continues to be powered to further heat the water.

BRIEF DESCRIPTION OF THE DRAWINGS

The invention is described in further detail in relation with the drawings, wherein:

FIG. 1 represents a schematic view of the liquid heating module of the

DETAILED DESCRIPTION

Figure 1:
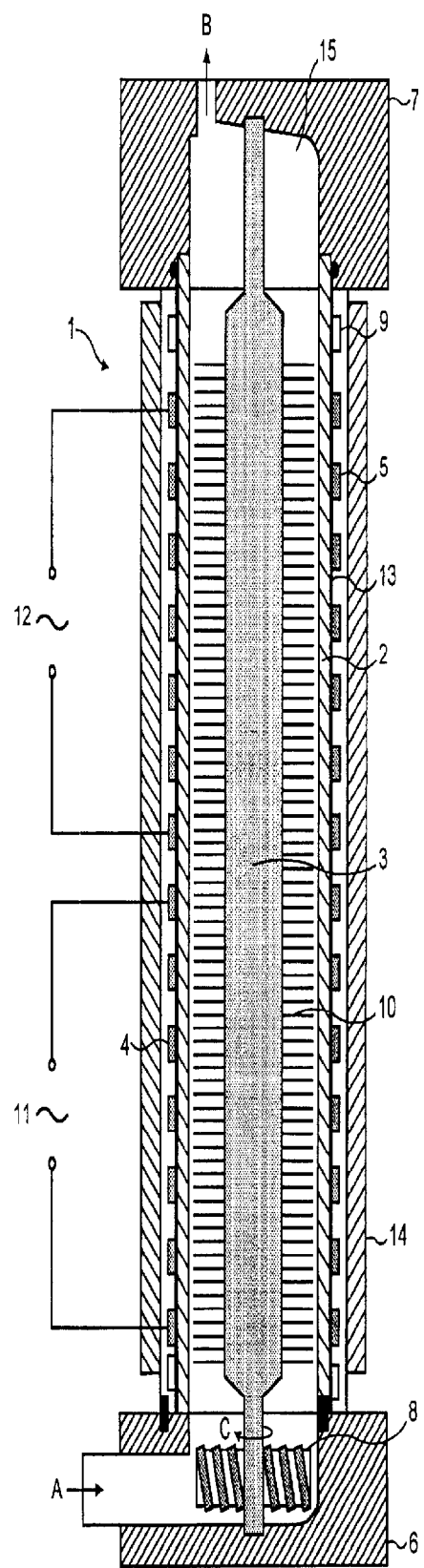

The liquid which has to be heated in the module of the invention is not critical and can be any type of liquid. Preferably, the liquid to be heated is water used, for example, for preparing tea, coffee or other types of beverages. It is also possible to heat milk for the preparation of cocoa beverages. The generation of steam can also be considered, for example, for directly heating water in a cup or for foaming milk. The use of the inventive heating module is ideal for small machines, such as home coffee machines and is also useful in larger machines, such as vending machines.

Concerning the electrical resistor for the first part of the tube, in the case of a coffee machine, one or two resistors are typically present. In the case of a vending machine, it is possible to have as many as five resistors. Concerning the electrical resistors for the second part of the tube, the same number of resistors applies as for the first electrical resistor depending upon the type of machine. More preferably, however, only one resistor is used.

Advantageously, the material for the hollow tube is a metal. Preferably, the tube is made of stainless steel. The size of the tube can vary, depending on the type of use. For example, if used in a coffee machine, the tube can have a diameter of about 6 to 20 mm, a length of about 100 to 200 mm, and a thickness of about 1 to 4 mm. If used in a vending machine, the tube generally has a diameter of about 30 to 50 mm, a length of about 200 to 400 mm, and a thickness of about 1 to 4 mm. For optimum heating performance, the ratio of the length of the hollow tube to the diameter of the tube is between about 5 and about 40.

The heating module according to the invention can also include a cylindrical insert which is disposed inside the hollow tube along its entire length and substantially along its axis of symmetry. The fact that an insert is present enhances heat transfer form the tube surface to the liquid when the heating element is powered. This allows a good transfer of energy and quick heating of the liquid. The insert is preferably made of a plastic or metallic material, which is of food grade and advantageously has a good thermal conductivity. The insert is preferably made of copper or Teflon (tetra-fluoro-ethylene). The ratio of the diameter of the hollow tube to the diameter of the insert is typically between about 2 and 5. It is possible to use either a fixed insert or an insert which can be rotated along the axis of symmetry of the tube. When a rotating insert is used, it is connected to a rotating wheel of a flowmeter disposed at the lower part of the insert and so it can be powered by the flowing water, which flows in a tangent angle on to the flowmeter propeller. A rotatable cylindrical insert typically comprises a metal wire brush. These metal brush bundles are integrated through the insert in a longitudinal plane either on one or two symmetric sides of the insert, or in a spiral configuration of, for example, 1 or 2 spirals. These are built only in the insert part inside the hollow tube. The brush should be of proper mechanical tensile and strength so that it can descale the inner tube surface. Both the brush bundle ends should be slightly contacted with the inside surface of the tube at approximately 90°. The whole bundle is advantageously designed to push water upwards when rotated by the flowmeter propeller.

The electrical resistors of the tube are made in the forms of wires or thick-films. The thick-film technology is known in the electronic area and is now used for the manufacture of resistors. This technology uses conductive inks or pastes applied over a substrate of quartz, metal, alumina or beryllium oxide. Preferably, the substrate is metallic.

The hollow tube comprises further at least one additional electrical resistor for temperature control. This resistor is disposed at the inlet or outlet of the cold/hot water from the tube.

The electrical resistors have a power density of up to about 30 to 70 Watt/cm². This power density allows a very quick increase of the temperature of the water from the room temperature to about 85 to 90° C. In order to have a good insulation of the hollow tube, it is preferred to have an enamel coating on the outside of the tube under the resistors. The thickness of this coating is normally between about 100 and 300 microns. Finally, the electrical resistors of the hollow tube are covered with an electrically non-conductive material, for example, a plastic. This insulation can be either a tube, a coating or a layer of a non-conductive material.

The liquid heating module of the invention is used as a part of a machine for the heating of a liquid for the preparation of a beverage. The present invention concerns further a system for the heating of a liquid comprising a water supply and a pump for supplying the water to the liquid heating module described herein, with all three elements being in fluid communication. Also, a channel is provided for the exit of heated liquid, either on a substance to be extracted or in a mixer to mix the heated liquid with a powder.

In the system of the invention, the tube may be either horizontally or vertically disposed. The tube is preferably vertically disposed.

The liquid heating module may be part of a coffee machine or another similar machine based on the extraction of a substance, such as coffee or tea. In this case, it is possible to have either directly the substance to be extracted, such as a bed of coffee, and then an espresso machine, or the substance to be extracted in already prepared cartridges or capsules, like those described in European patents Nos. 512,468 and 602,203.

According to a second embodiment, the system of the invention is used for vending machines, that is a machine where the consumer directly obtains a cup of tea, coffee, cocoa, or soup, wherein the heated liquid is mixed just before being delivered in a cup with the corresponding powder.

The system of the invention integrates also other usual elements present normally in coffee or vending machines, such as a valve, a temperature control, and a flowmeter.

The present invention concerns finally a process for heating a liquid for preparing such beverages. The liquid is fed through the liquid heating module as described herein at a flow rate of from about 150 to 1000 ml/min in order to be heated to a temperature of about 85 to 90° C. in about 3 to 10 seconds. The electrical resistor on the first part of the tube is permanently connected to power and the electrical resistor on the second part of the tube is intermittently connected to power according to a certain frequency depending on the required end temperature.

It is possible according to the process of the invention to heat a liquid such as water in a few seconds from room temperature to about 85 to 90° C., without the need of having the machine permanently switched on. The heating of the electrical resistors only occurs when the consumer requests a beverage. The first electrical resistor, for example, increases the temperature of the water from about 20 to 60° C., so that the second electrical resistor or group of electrical resistors only needs to increase the temperature from about 60 to 85° C. Therefore, there is no need to have permanent heating by this second electrical resistor. In this case, the electrical resistor on the second part of the tube is connected to power only during about 50 to 100% of the time at full power.

In the case of the first embodiment of the system of the invention, that is a coffee machine, the flow rate of the water to be heated is between about 150 and 300 ml/min. In the case of a vending machine, the flow rate of water is between about 300 and 1000 ml/min.

Referring now to FIG. 1 of the drawings, the heating module (1) comprises a hollow tube (2) made of stainless steel, a cylindrical insert (3) made of a plastic such as Teflon, a first electrical resistor (4) on the first part of the tube and a second electrical resistor (5) on the second part of the tube. Both of these electrical resistors are made of a thick-film and are connected to the power (11,12). The direction of the flow of water in the hollow tube is given by arrows A and B. The hollow tube is vertically installed to minimize air or steam accumulation inside the tube. Both ends of the insert are fixed on the cold water cap (6) and on the hot water cap (7). The insert (3) is connected to the rotating wheel of the flowmeter (8) and so it can be powered by the flowing cold water and rotated according to arrow C. A resistor (9) is furthermore disposed at the end of the hollow tube for measuring and controlling the temperature of the hot water leaving the module. Metal brush bundles (10) are built on the insert inside the hollow tube. A dielectric insulation (13), such as an enamel, is painted or coated on the tube under the resistors. For avoiding a high loss of energy and guaranteeing better safety, insulation (14) covers the resistors along the entire length of the hollow tube. A free space (15) is provided into the hot water cap (7) for the buffering and the collecting of generated steam and separated air.

The liquid heating module operates as follows: when the consumer requests a beverage, both resistors (4,5) are under power. Resistor (4) remains permanently under power during the flowing of water through the hollow tube, whereas resistor (5) is switched on and switched off according to a certain frequency based on the remained required demand of energy to reach the final temperature of water necessary for preparation of the beverage. For example, resistor (4) allows an increase of temperature from about 20 to 65° C. and the second resistor (5) has then only to provide the energy for increasing the water temperature from about 65 to 85° C. Because of the flowing water, the flowmeter (8) rotates and drives with it the insert (3). The metallic brush (10) on the insert avoids any deposit of calcium on the inside of the hollow tube.

Figure 2:
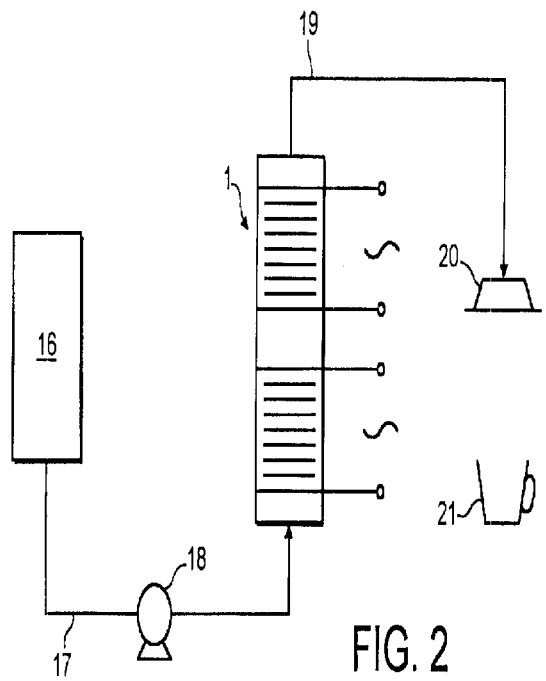
FIG. 2 represents a schematic view of a coffee machine comprising the module of FIG. 1.

FIG. 2 illustrates the use of module (1) in a coffee machine. The machine comprises a cold water tank (16) connected through a pipe (17) to a pump (18) delivering the cold water to the heating module (1). At the exit of the module (1), the hot water flows through a conduit (19) and arrives on a cartridge (20) containing a beverage forming substance, such as roast and ground coffee. This cartridge is a sealed cartridge opening under pressure according to the European patent No. 512,468. The ready to drink coffee flows in a cup (21). The coffee machine can integrate further elements, a valve or electronic controls, as is typical in the art.

Figure 3:
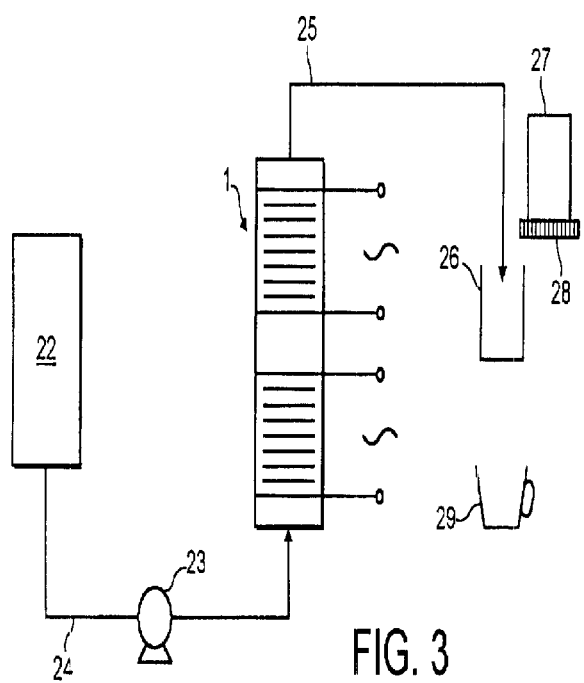
FIG. 3 represents a schematic view of a vending machine comprising the module of FIG. 1.

FIG. 3 illustrates the use of module (1) in a vending machine. The cold water of the tank (22) flows through a pipe (24) with the help of a pump (23) in the heating module (1).

At the exit of the module, the water reaches a temperature of about 85° C. and flows through conduit (25) to a mixer (26). Simultaneously with the arrival of hot water, a powder, such as coffee powder, is fed in the mixer from a powder storage (27) through a screw or auger (28). The powder is mixed with the hot water and then delivered in a cup (29). Again, the machine can also integrate further elements that are normally present in such machines.

EXAMPLE

The specification is now made in relation with a specific example related with a heating module for a coffee machine.

A stainless steel hollow tube having a diameter of 12 mm with a length of 160 mm is used. The insert is made of plastic and has a diameter of 4 mm and the same length as the hollow tube. The resistors (4) and (5) have each a power of 600 Watts. The tube supports a maximum pressure of 20 bar. The water flows with a flow rate of 200 ml/min. The required temperature is reached within 7 sec. And the second resistor is on during 60% of the time. With this heating module, the temperature is very constant over time and has a variation of only about 2° C.

What is claimed is:

1. A liquid heating module for use in a hot beverage machine, which comprises:
   a hollow metal tube;
   at least one electrical resistor located on a first outer part of the tube for preheating liquid flowing through the tube;
   at least one additional electrical resistor located on a second outer part of the tube for temperature adjustment of the liquid flowing through the tube; and
   a temperature controller associated with the tube for measuring the temperature thereof and with the additional resistor for automatically selectively powering and disconnecting the additional resistor, separately from the other resistor, depending on the temperature of the tube for controlling the temperature of the liquid.

2. The liquid heating module of claim 1, wherein the hollow tube is made of stainless steel.

3. The liquid heating module of claim 1, wherein the hollow tube has a ratio of length to diameter of between about 5 and about 40.

4. The liquid heating module of claim 1, further comprising a cylindrical insert which is disposed inside the hollow tube, along substantially its entire length and substantially along an axis of symmetry.

5. The liquid heating module of claim 4, wherein the cylindrical insert is made of a plastic or metallic material.

6. The liquid heating module of claim 5, wherein the insert is fixed in position.

7. The liquid heating module of claim 5, wherein the cylindrical insert is rotatable within the tube and comprises a metal wire brush.

8. The liquid heating module of claim 1, wherein the temperature control mechanism comprises at least one additional electrical resistor located on an outer part of the hollow tube for temperature measurement and temperature control of the liquid.

9. The liquid heating module of claim 1, wherein the electrical resistors present on the tube comprise a thick film resistor.

10. The liquid heating module of claim 9, wherein each electrical resistor has a power density of up to about 30 to 70 Watt/cm$^2$.

11. The liquid heating module of claim 10, wherein the hollow tube includes an enamel coating on its outer surface at least beneath the resistors.

12. The liquid heating module of claim 11, wherein the electrical resistors are insulated with an electrically non-conductive material.

13. A system for the heating of a liquid, comprising:
    a water supply;
    the liquid heating module of claim 1;
    a pump for directing water from the supply to the liquid heating module; and
    a channel for the exit of heated liquid, either onto a substance to be extracted or into a mixer for mixing with a powder, to thus form a beverage.

14. A process for heating a liquid, which comprises feeding a liquid through a tube of a liquid heating module at a flow rate of from 150 to 1000 ml/min in order to heat the liquid to a temperature of about 85 to 90° C. in about 3 to 10 seconds, wherein an electrical resistor on first outer part of the tube is permanently connected to power and an electrical resistor on the second outer part of the tube is intermittently connected to power according to a certain frequency depending on the required final temperature of the liquid.

15. The process of claim 14, wherein the electrical resistor on the second outer part of the tube is connected to power during about 50 to 100% of the time that the other electrical resistor is at full power.

16. The process of claim 14, wherein the liquid has a flow rate of between about 150 and 300 ml/min for a coffee machine and between about 300 and 1000 ml/min for a vending machine.

17. The process of claim 14, wherein the temperature of the liquid at the exit of the tube is measured, so that if the temperature is too high the electrical resistor on the second outer part of the tube is disconnected from power, while if the temperature of the liquid is not high-enough, this electrical resistor continues to be connected to power.

18. A hot beverage machine, comprising:
    the liquid heating module of claim 1; and
    a tank connected downstream of the resistors containing the liquid;
    wherein the heating module is disposed in an open circuit between the tank and a dispensing location for dispensing the beverage from the beverage machine.

19. A liquid heating module for use in a hot beverage machine, comprising:
    a hollow metal tube;
    at least one electrical resistor located on a first outer part of the tube for preheating liquid flowing through the tube;
    at least one additional electrical resistor located on a second outer part of the tube for temperature adjustment of the liquid flowing through the tube; and
    a cylindrical insert which is disposed inside the hollow tube, along substantially its length and substantially along an axis of symmetry, wherein the insert is capable of rotation about substantially the axis of symmetry of the tube, and a lower part of the insert is connected to a rotating wheel of a flowmeter for rotation therewith.

20. A liquid heating module for a beverage machine, comprising:
    a hollow tube of heat-conductive material;
    at least one electrical heating element in conductive association with the tube and configured for preheating flowing liquid that flows through the tube; and
    an insert disposed inside the hollow tube and extending substantially axially therewith, wherein the insert comprises a wire brush.

21. The heating module of claim 20, further comprising a rotating member configured for rotation powered by the flowing liquid and being drivingly connected to the insert for rotating the insert.

22. The heating module of claim 21, wherein the tube has an inside surface, and the wire brush is in contact with the inside surface of the tube.

23. The heating module of claim 20, wherein the wire brush is of a metal.

24. A liquid heating module for a beverage machine, comprising:

a hollow tube of heat-conductive material;

at least one electrical heating element in conductive association with the tube and configured for preheating flowing liquid that flows through the tube; and an insert disposed inside the hollow tube and extending substantially axially therewith, wherein the insert is configured for rotation within the tube powered by the liquid flow through the tube.

25. A beverage machine, comprising:

the liquid heating module of claim 24; and at least one additional electrical resistor located on a second outer part of the tube for temperature adjustment of the liquid flowing through the tube.

* * * * *